(12) United States Patent
Skov et al.

(10) Patent No.: US 10,278,157 B2
(45) Date of Patent: Apr. 30, 2019

(54) ALLOCATION OF RESOURCES

(75) Inventors: Peter Skov, Beijing (CN); Chunli Wu, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 50 days.

(21) Appl. No.: 13/996,194

(22) PCT Filed: Dec. 22, 2010

(86) PCT No.: PCT/CN2010/080144
§ 371 (c)(1),
(2), (4) Date: Jun. 20, 2013

(87) PCT Pub. No.: WO2012/083539
PCT Pub. Date: Jun. 28, 2012

(65) Prior Publication Data
US 2013/0301604 A1   Nov. 14, 2013

(51) Int. Cl.
*H04W 72/02* (2009.01)
*H04L 5/00* (2006.01)
(Continued)

(52) U.S. Cl.
CPC .......... *H04W 72/02* (2013.01); *H04L 1/1812* (2013.01); *H04L 5/0023* (2013.01);
(Continued)

(58) Field of Classification Search
CPC ..... H04L 5/0048; H04L 5/0053; H04L 5/003; H04L 5/0023; H04L 25/0204; H04L 5/0035; H04L 1/1812; H04L 25/03898; H04L 5/0039; H04L 5/0094; H04L 1/0002; H04B 7/024; H04B 7/0404;
(Continued)

(56) References Cited

U.S. PATENT DOCUMENTS 8,259,825 B2 * 9/2012 Love ............... H04L 5/0048
375/219
8,446,886 B2 * 5/2013 Hu ................. H04L 5/0026
370/335
(Continued)

FOREIGN PATENT DOCUMENTS

CN    1525782 A    9/2004
CN    101087170 A    12/2007
(Continued)

OTHER PUBLICATIONS

Kang et al (U.S. Appl. No. 61/329,103) filed Apr. 29, 2010.*
(Continued)

*Primary Examiner* — Wutchung Chu
(74) *Attorney, Agent, or Firm* — Harrington & Smith

(57) ABSTRACT

This disclosure relates to control of communications by a communication device in a service area. Resources for simultaneous communications via a plurality of antennas in the service area are allocated and information of said allocated resources are sent via a plurality of control channels to the communication device. The communication device receives the plurality of control channels and can communicate simultaneously via the plurality of antennas based on the information.

19 Claims, 4 Drawing Sheets

(51) Int. Cl.
  *H04W 72/04* (2009.01)
  *H04L 25/03* (2006.01)
  *H04L 1/18* (2006.01)
  *H04B 7/022* (2017.01)
  *H04B 7/0417* (2017.01)
  *H04B 7/06* (2006.01)
  *H04L 1/00* (2006.01)
  *H04W 76/15* (2018.01)

(52) U.S. Cl.
  CPC .......... *H04L 5/0039* (2013.01); *H04L 5/0048* (2013.01); *H04L 5/0053* (2013.01); *H04L 5/0094* (2013.01); *H04L 25/03898* (2013.01); *H04W 72/042* (2013.01); *H04B 7/022* (2013.01); *H04B 7/0417* (2013.01); *H04B 7/063* (2013.01); *H04L 1/0002* (2013.01); *H04W 72/046* (2013.01); *H04W 76/15* (2018.02)

(58) Field of Classification Search
  CPC .. H04B 7/0413; H04B 7/0669; H04B 7/0671; H04B 7/022; H04B 7/0417; H04B 7/063; H04B 7/0623; H04B 7/0634; H04W 72/04; H04W 72/042; H04W 72/0406; H04W 72/0446; H04W 48/12; H04W 72/1289; H04W 72/00; H04W 72/0493; H04W 72/044; H04W 72/02; H04W 72/048; H04W 72/12; H04W 72/1205; H04W 72/121; H04W 72/1247; H04W 74/006; H04W 72/046; H04W 76/15
  USPC .......................................... 370/329; 455/450
  See application file for complete search history.

(56) References Cited

U.S. PATENT DOCUMENTS

| | | | | |
|---|---|---|---|---|
| 8,559,354 B2* | 10/2013 | Kwon | H04L 5/0023 | 370/312 |
| 8,937,897 B2* | 1/2015 | Hoshino | H04J 11/003 | 370/312 |
| 8,989,208 B2* | 3/2015 | Chen | H04L 5/0053 | 370/329 |
| 9,344,259 B2* | 5/2016 | Love | H04L 5/0091 | |
| 9,420,575 B2* | 8/2016 | Kim | H04L 5/001 | |
| 9,722,751 B2* | 8/2017 | Kim | H04L 5/0007 | |
| 2003/0087673 A1* | 5/2003 | Walton et al. | 455/562 | |
| 2005/0213682 A1* | 9/2005 | Han et al. | 375/267 | |
| 2007/0254652 A1* | 11/2007 | Khan | H04B 7/0417 | 455/435.1 |
| 2008/0037679 A1* | 2/2008 | Khan | H04B 7/0697 | 375/267 |
| 2008/0225964 A1* | 9/2008 | Han et al. | 375/260 | |
| 2008/0299917 A1* | 12/2008 | Alexiou | H04B 7/0639 | 455/103 |
| 2009/0219870 A1 | 9/2009 | Wengerter et al. | 370/329 | |
| 2009/0253429 A1* | 10/2009 | Lee | H04W 72/048 | 455/434 |
| 2009/0274077 A1* | 11/2009 | Meylan et al. | 370/280 | |
| 2009/0304096 A1 | 12/2009 | Khattab et al. | 375/260 | |
| 2010/0027454 A1* | 2/2010 | Hou | H04B 7/024 | 370/312 |
| 2010/0027456 A1 | 2/2010 | Onggosanusi et al. | | |
| 2010/0034310 A1* | 2/2010 | Nam | H04L 1/0606 | 375/267 |
| 2010/0040004 A1 | 2/2010 | Damnjanovic et al. | 370/329 | |
| 2010/0254268 A1* | 10/2010 | Kim | H04W 36/385 | 370/241 |
| 2010/0265841 A1* | 10/2010 | Rong | H04L 5/0023 | 370/252 |
| 2010/0272032 A1 | 10/2010 | Sayana et al. | | |
| 2010/0279628 A1* | 11/2010 | Love | H04L 5/003 | 455/70 |
| 2010/0285792 A1* | 11/2010 | Chen | H04W 72/005 | 455/422.1 |
| 2010/0303016 A1* | 12/2010 | Jin | H04L 27/0008 | 370/328 |
| 2010/0303034 A1 | 12/2010 | Chen et al. | | |
| 2010/0323709 A1* | 12/2010 | Nam | H04B 7/043 | 455/450 |
| 2011/0064159 A1* | 3/2011 | Ko et al. | 375/267 | |
| 2011/0103324 A1* | 5/2011 | Nam | H04L 5/0048 | 370/329 |
| 2011/0114593 A1* | 5/2011 | Ishii | B65D 41/325 | 215/253 |
| 2011/0134875 A1* | 6/2011 | Ding | H04B 7/024 | 370/329 |
| 2011/0149886 A1* | 6/2011 | Xu | H04B 7/0628 | 370/329 |
| 2011/0176502 A1* | 7/2011 | Chung et al. | 370/329 | |
| 2011/0269459 A1* | 11/2011 | Koo | H04B 7/022 | 455/434 |
| 2011/0287790 A1* | 11/2011 | Haustein | H04B 7/0417 | 455/500 |
| 2011/0299449 A1* | 12/2011 | Kwon | H04L 5/0023 | 370/312 |
| 2012/0026953 A1 | 2/2012 | Ogawa et al. | 370/329 | |
| 2012/0057566 A1* | 3/2012 | Ahmadi | H04L 12/5692 | 370/331 |
| 2012/0063324 A1* | 3/2012 | Kim | H04L 5/0007 | 370/241 |
| 2012/0108254 A1* | 5/2012 | Kwon et al. | 455/450 | |
| 2012/0163335 A1* | 6/2012 | Chung | H04L 5/0023 | 370/330 |
| 2012/0182974 A1* | 7/2012 | Dai | H04L 5/0048 | 370/336 |
| 2012/0213167 A1* | 8/2012 | Xu | H04B 7/0413 | 370/329 |
| 2012/0322492 A1* | 12/2012 | Koo | H04B 7/0417 | 455/517 |
| 2013/0010964 A1* | 1/2013 | Fong | H04L 5/0053 | 380/277 |
| 2013/0021991 A1* | 1/2013 | Ko | H04B 7/0413 | 370/329 |
| 2013/0094411 A1* | 4/2013 | Zhang | H04L 5/0048 | 370/281 |
| 2013/0128832 A1* | 5/2013 | Kang | H04W 72/042 | 370/329 |
| 2013/0201926 A1* | 8/2013 | Nam | H04L 1/1685 | 370/329 |

FOREIGN PATENT DOCUMENTS

| | | |
|---|---|---|
| JP | 2007116742 A | 5/2007 |
| JP | 2009/524298 A | 6/2009 |
| JP | 2009527958 A | 7/2009 |
| JP | 2009290341 A | 12/2009 |
| JP | 2010/219817 A | 9/2010 |
| JP | 2010534020 A | 10/2010 |
| JP | WO-2010/092826 A1 | 8/2012 |
| WO | WO 2008123509 A1 | 10/2008 |
| WO | WO-2009/037580 A2 | 3/2009 |
| WO | WO 2010/064842 A2 | 6/2010 |
| WO | WO 2010/070194 A1 | 6/2010 |
| WO | WO 2010/126711 A1 | 11/2010 |
| WO | WO 2010125738 A1 | 11/2010 |

OTHER PUBLICATIONS

Taimour Aldalgamouni et al: "Optimized resource allocation for the uplink of SFBC-CDMA systems" 33rd IEEE Conference on Local Computer Networks (LCN 2008)—Oct. 14-17, 2008—Montreal, Que, Canada, IEEE, Piscataway, NJ, USA, Oct. 14, 2008 (Oct. 14, 2008), pp. 478-483, XP031355883, ISBN: 978-1-4244-2412-2 *abstract*.

(56) References Cited

OTHER PUBLICATIONS

R1-105534; Nokia Siemens Networks, Nokia; "Remaining Details of Transmission Mode 9 and DCI 2C"; 3GPP TSG RAN WG1 Meeting #62bis; Xi'an, China, Oct. 11-15, 2010.

* cited by examiner

ALLOCATION OF RESOURCES

This disclosure relates to allocation of resources for wireless communication.

Communication between two or more entities such as mobile communication devices and other stations can be facilitated by a communication system. A communication system and compatible communication devices typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two stations occurs over a wireless link. In wireless systems a communication device thus typically provides a transceiver station that can communicate with the access node and/or another communications device. Examples of wireless systems include public land mobile networks (PLMN), satellite based communication systems and different wireless local networks, for example wireless local area networks (WLAN).

In wireless systems an access node is provided by a base station. The radio coverage area of a base station is known as a cell, and therefore the wireless systems are often referred to as cellular systems. In some systems a base station access node is called Node B.

A communication system can be accessed by means of an appropriate communication device. A communication device of a user is often referred to as user equipment (UE). A communication device is provided with an appropriate signal receiving and transmitting arrangement for enabling communications with other parties. A feature of wireless communication devices is that they offer mobility for the users thereof. A mobile communication device, or mobile device for short, may also be transferred, or handed over, from a base station to another and even between base stations belonging to different systems.

Transmission diversity has been proposed to enhance performance. For example, a single antenna port mode with transmission diversity has been proposed. Another approach is to use multiple input multiple output (MIMO) multi-antenna arrangements. Downlink (DL) MIMO has been proposed for LTE release 8 and uplink (UL) MIMO for LTE release 10. In this proposal multiple transmission blocks (TBs) can be carried on the same resources. However, allocation of different resources for multiple transmission blocks is not possible, and thus multi-antenna stations can offer only limited scheduling flexibility. Two directional antennas from two antenna sites can also be arranged to point towards each other and so that they are seen as a single cell. One transport block can be supported per transmit antenna, mapped on the same frequency resources. However, the gain of transmission diversity mode is not as high as for example in the multiple input multiple output (MIMO) multi-antenna arrangements because the channel quality of the two links can be significantly different when directional antennas are used.

Embodiments of the invention aim to address one or several of the above issues.

In accordance with an embodiment there is provided a method for controlling communications by a communication device, comprising receiving on a plurality of control channels information of resources allocated for the communication device for communications via a plurality of antennas in a service area, and communicating simultaneously via the plurality of antennas based on the information.

In accordance with an embodiment there is provided a method for resource allocation in a service area of a communication system, comprising allocating resources for a communication device for simultaneous communications via a plurality of antennas in the service area, and sending via a plurality of control channels information of said allocated resources to the communication device.

In accordance with an embodiment there is provided an apparatus for controlling use of resources by a communication device in a service area, the apparatus comprising at least one processor, and at least one memory including computer program code, wherein the at least one memory and the computer program code are configured, with the at least one processor, to monitor for a plurality of control channels to receive information of resources allocated for communications via a plurality of antennas in the service area; and to cause simultaneous communications via the plurality of antennas based on the information.

In accordance with an embodiment there is provided an apparatus for controlling use of resources by a communication device in a service area, the apparatus comprising at least one processor, and at least one memory including computer program code, wherein the at least one memory and the computer program code are configured, with the at least one processor, to allocate resources for the communication device for simultaneous communications via a plurality of antennas in the service area, and to cause sending of information of said allocated resources via a plurality of control channels to the communication device.

In accordance with a more detailed embodiment said information comprises a resource grant allocating a transport block. A multiple of resource grants may be signalled within a subframe.

Resources may be allocated independently for communication via each of the antennas. Different resources may be allocated for transport blocks associated with different antennas.

The simultaneous communications can comprise communications on a single carrier.

The control channels may be associated with antenna ports and transport blocks. Reference signals may be mapped to antenna ports of the plurality of antennas. A reference signal channel may be mapped to a shared physical channel.

Information of at least one of transmitted transport block, code word, rank, and antenna port may be communicated in a downlink control information element. The information about the allocated resources may be signalled on a physical downlink control channel.

An offset may be used between search spaces associated with the control channels.

The plurality of antennas can comprise directional antennas of a cell.

The communication device may move relative to the plurality of antennas.

The communication device may be configured to have a transmission mode enabling use of the plurality of control channels and antennas.

A computer program comprising program code means adapted to perform the herein described methods may also be provided. In accordance with further embodiments apparatus and/or computer program product that can be embodied on a computer readable medium for providing at least one of the above methods is provided.

Various other aspects and further embodiments are described in the following detailed description and in the attached claims.

For a better understanding of some embodiments of the invention, reference will be made by way of example only to the accompanying drawings in which.

In the following certain exemplifying embodiments are explained with reference to a wireless or mobile communication system serving mobile communication devices. Therefore, before explaining in detail the exemplifying embodiments, certain general principles of a wireless communication system and mobile communication devices are briefly explained to assist in understanding the technology underlying the described examples.

A non-limiting example of communication systems is the long-term evolution (LTE) of the Universal Mobile Telecommunications System (UMTS) that is being standardized by the 3rd Generation Partnership Project (3GPP). A further development of the LTE is referred to as LTE-Advanced. A LTE base station is known as NodeB (NB) in the vocabulary of the 3GPP specifications. The LTE based systems can employ a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio service include those provided by base stations of systems that are based on technologies such as wireless local area network (WLAN) and/or WiMax (Worldwide Interoperability for Microwave Access).

Regardless of the underlying standard, a mobile communication device can be provided wireless access via at least one base station or similar wireless transceiver node of an access system.

An access system may be provided by a cell of a cellular system or another radio service area enabling a communication device to access a communication system. Therefore an access system is hereinafter referred to as a radio service area or cell. Typically a cell is provided by a base station site. A base station site can provide a plurality of sectors, for example three radio sectors, each sector providing a cell or a sub radio service area of a cell.

Figure 1:
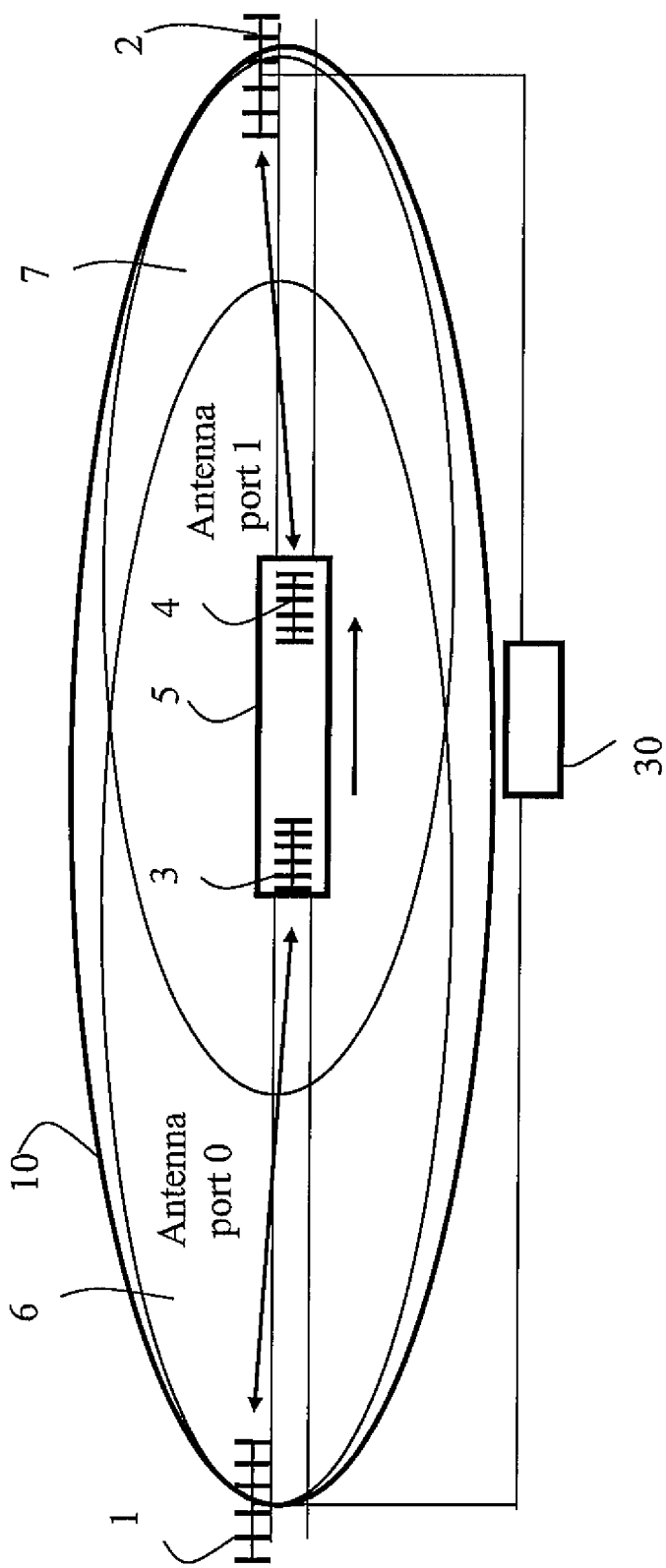
FIG. 1 shows a reference signal mapping for a backhauling scenario with one antenna port from each direction.

As shown in the example of FIG. 1, a plurality of antenna sites 1 and 2 connected to a controller 30 can provide a cell 10. In the FIG. 1 example each of the antenna sites 1 and 2 provides a directional antenna providing beams 6 and 7. As shown, the directional beams 6 and 7 can overlap each other. An appropriate transmission scheme can be used to enable the two antenna site transmission diversity and reception or transmission of two transport blocks. The communications can take place on a single carrier, for example on a frequency resource.

A LTE based backhauling can be used for providing communication link for users on moving vehicles. For example, a node on a train 5 that can communicate with fixed eNBs adjacent to the tracks can be provided. In the example of FIG. 1 the train block 5 can be seen an example of a communication device that is provided with two directional antennas. The antennas 3 and 4 of the train 5 can comprise relay nodes serving user equipment on the train. The cell and the relay nodes on the train can both have directional antennas. If directional antennas are provided at both the receiver and the transmitter areas occur along the tracks where two strong links can be created. One of the links can be between the antenna 4 on the train pointing forwards and the antenna site 2 in front of the train. The other link would then be between the antenna 3 on the train pointing backwards to the antenna site 1 at the back of the train.

Regardless of the implementation, the herein described embodiment exemplifies a node acting as a communication device in communication with a controlling node of a radio service area, for example an eNB of a LTE cell. Thus block 5 of FIG. 1 can be seen as presenting any multi-antenna mobile communication device in communication with two antenna sites of an eNB or similar base station arrangement.

In accordance with an aspect, to exploit the two links provided by the two separate antenna sites of a cell, communications between the communication device and the cell are provided simultaneously between the communication device and both antenna sites. There are different ways to support that. For example, the two directional antennas 1 and 2 of the two antenna sites can be arranged to point towards each other and so that they are seen as a single cell. A dual port common reference signal (CRS) can be configured with one common reference signal (CRS) port for each antenna.

A base station arrangement comprising a plurality of antenna sites can be controlled by at least one appropriate controller 30 so as to enable operation thereof and management of mobile communication devices in communication with the base station via the plurality of antenna sites. The control apparatus can be interconnected with other control entities. The base station can be connected to a wider communications network. A controller may be provided for coordinating the operation of the access systems. A gateway function may also be provided to connect to another network via the network. The other network may be any appropriate network. A wider communication system may thus be provided by one or more interconnect networks and the elements thereof, and one or more gateways may be provided for interconnecting various networks.

Figure 2:
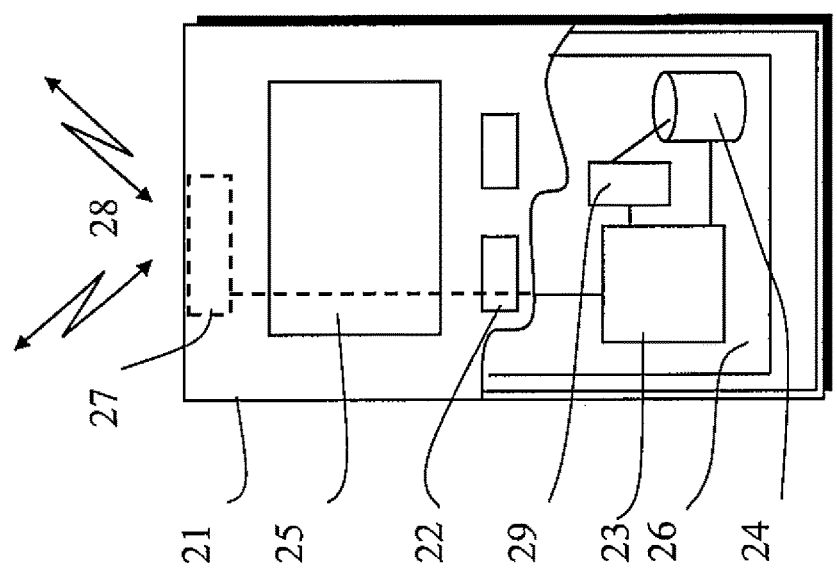
FIG. 2 shows an example of a communication device.

FIG. 2 shows a schematic, partially sectioned view of a communication device 21 that a user can use for communication. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The mobile communication device 21 may receive and transmit signals over an air interface 28 via appropriate apparatus for receiving and transmitting signals. For example, in FIG. 1 the mobile communication device may communicate with the antenna sites 1 and 2 via directional antennas 3 and 4. In FIG. 2 transceiver apparatus is designated schematically by block 27. The transceiver may be provided for example by means of a radio part and associated antenna arrangement. The antenna arrangement may be arranged internally or externally to the mobile device. A wireless communication device can be provided with a Multiple Input/Multiple Output (MIMO) antenna system.

A mobile communication device is also typically provided with at least one data processing entity 23, at least one memory 24 and other possible components 29 for use in software and hardware aided execution of tasks it is designed to perform, including control of access to and communications with base stations and other communication devices. The data processing, storage and other relevant control apparatus can be provided on an appropriate circuit board and/or in chipsets. This feature is denoted by reference 26. Possible control functions in view of configuring the mobile communication device for reception and/or transmission of signalling information and data by means of the data processing facility in accordance with certain embodiments of the present invention will be described later in this description.

The user may control the operation of a communication device by means of a suitable user interface such as keypad 22, voice commands, touch sensitive screen or pad, combinations thereof or the like. A display 25, a speaker and a microphone are also typically provided. Furthermore, a mobile communication device may comprise appropriate connectors (either wired or wireless) to other devices and/or for connecting external accessories, for example hands-free equipment, thereto.

Figure 3:
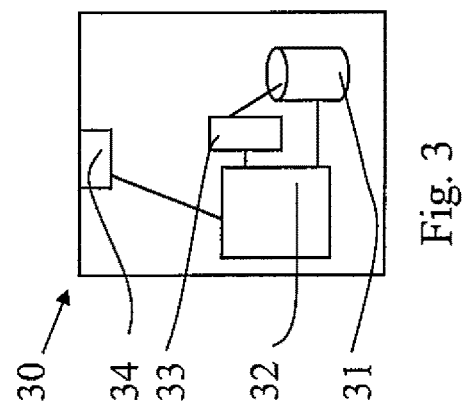
FIG. 3 shows an example of controller apparatus for a base station.

FIG. 3 shows an example of a control apparatus 30, for example to be coupled to a base station and/or at least two antenna sites and for controlling communications via at least two links provided within the radio service area of the base station. The control apparatus 30 can be arranged to provide control on use of resources for communications by mobile communication devices that are in the service area via the at least two different links. The control apparatus 30 can be configured to provide control functions in association with generation and communication of resource allocation information and other related information and for coordination of resource allocation for signalling and data communications by means of the data processing facility in accordance with certain embodiments described below. For this purpose the control apparatus 30 comprises at least one memory 31, at least one data processing unit 32, 33 and an input/output interface 34. Via the interface the control apparatus can be coupled to receiver and transmitter apparatus of a base station. The control apparatus 30 can be configured to execute an appropriate software code to provide the control functions.

The required data processing apparatus and functions of a base station apparatus, a communication device, a relay, and any other appropriate station may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

Various channels are typically provided between devices communicating in a communication system. A physical downlink control channel (PDCCH) is an example of a control channel that can be used to carry scheduling assignments and other control information in association with resource allocation. A physical control channel can be transmitted on an aggregation of one or several consecutive control channel elements.

The two antennas 1 and 2 are separately located. The antennas 1 and 2 can nevertheless be connected to the same base station, for example an eNB. Thus, although two antenna sites are provided in a cell, it can comprise only one base station. The controller 30 of the base station can allocate independently different resources for each link with a separate control channel, for example a separate physical downlink control channel (PDCCH).

Figure 4:
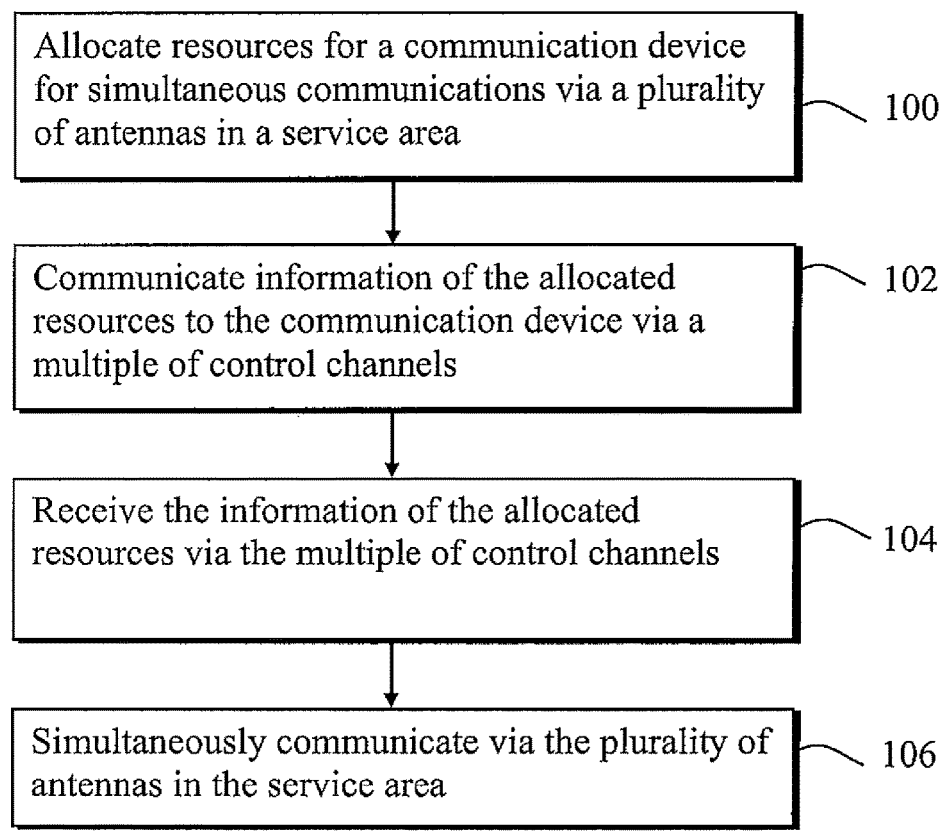
FIG. 4 is flowchart illustrating an embodiment.

FIG. 4 is a flowchart in accordance with an embodiment where multiple control channels are made available for a communication device in the area of a cell. The multiple physical control channels can be transmitted, for example, using space frequency block coding (SFBC). More particularly, a controller can allocate resources at 100 for a communication device for simultaneous communications via a plurality of antennas in a service area. At 102 the controller causes sending of information of said allocated resources via a plurality of control channels to the communication device. The communication device monitors for the control channels and thus receives the information at 104. The communication device may then communicate simultaneously at 106 via the plurality of antennas based on the information.

The communications between the communication device and the two antenna sites can take place on a single carrier. Information associated with an antenna and communicated via a control channel may comprise a resource grant allocating a transport block. A multiple of resource grants may be signalled within a subframe. The resources may be allocated independently for communication via each of the antennas.

In order to improve the flexibility of arrangement where multiple transport blocks (TBs) can be transported on the same resources the allocation of physical resource blocks (PRBs) can be done independently for the two transport blocks. For example, the controller 30 may allocate for two transport blocks different resources such as physical resource blocks (PRBs), modulation and coding scheme (MCS), transport block size (TBS) and so forth for each link with separate PDCCHs.

In accordance with a possibility two antenna transmission diversity can be provided for example based on Alamouti style space frequency diversity block coding where two transport blocks can be transmitted or received. In this scheme a transport block can be supported per transmit antenna, mapped on the same frequency resources. The modulation and coding scheme (MCS) for the two links can be flexibly adjusted and thus bit rate can be adapted to the link quality independently for the two antennas or transport blocks.

The embodiments may provide more scheduling flexibility for a scheduler, for example an eNB scheduler. The ENB scheduler can be provided in the control apparatus 30 of FIG. 3.

Figure 5:
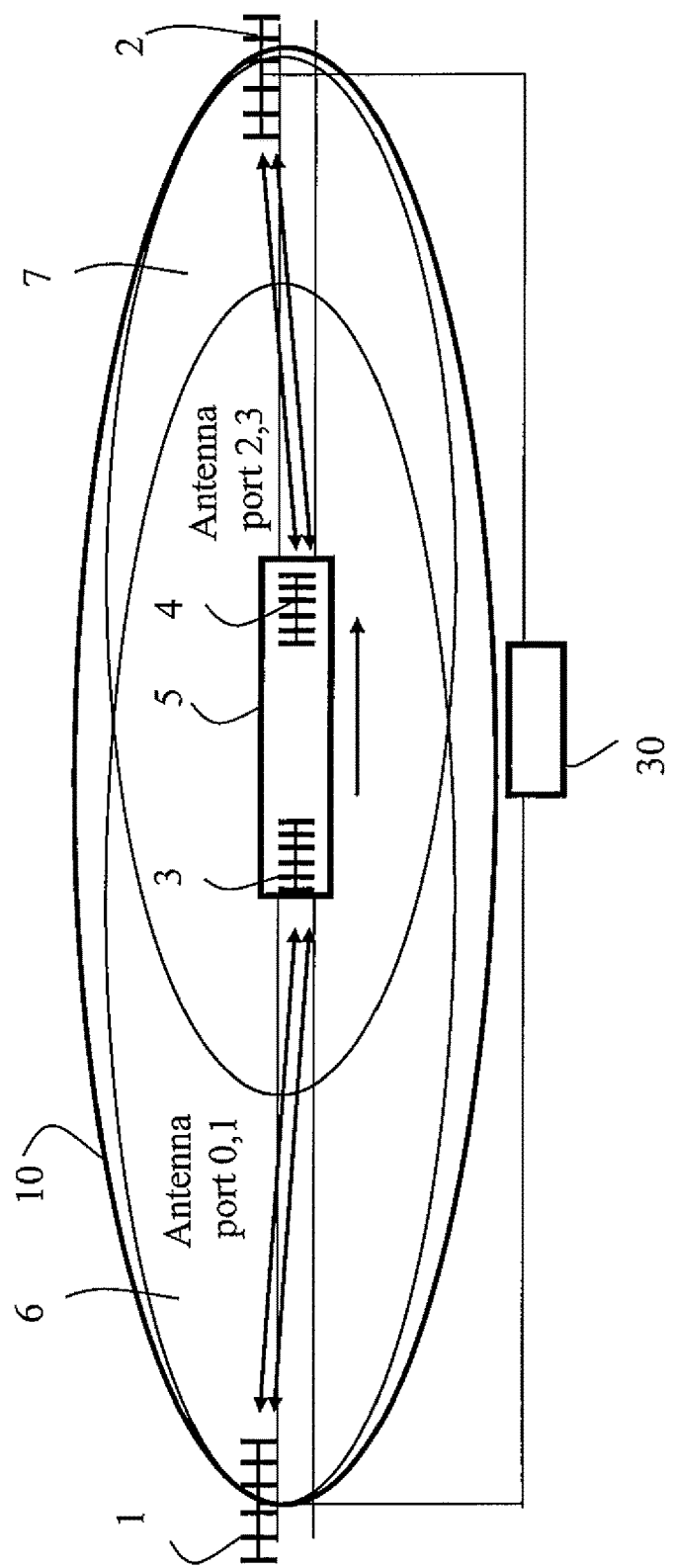
FIG. 5 shows a reference signal mapping for a backhauling scenario with multiple antenna ports from each direction.

The multi-antenna multi-site diversity scheme can be extended for example to a case where there are two transmitter receiver (trx) chains for each link, meaning four transmitter receivers and ports altogether. This is illustrated in FIG. 5.

In accordance with an embodiment the network transmits multiple downlink and/or uplink resource grants to the user equipment within a sub frame. Each grant can allocate one transport block. In accordance with a possibility more than one transport blocks is allocated by at least one of the multiple grants.

A communication device can be configured to have a particular mode of operation where the communication device can receive and process the multiple control channels. In accordance with an embodiment, a common reference signal (CRS) based transmission mode is provided. When in this mode a communication device, for example a mobile user equipment can receive information about a code word to antenna port mapping and rank used for the transmission. The information is provided in order to enable the user equipment to map a common reference signal channel to a physical downlink shared channel (PDSCH). This information can be transmitted in an appropriate control information element.

For example, a modified downlink control information (DCI) format 1B can be used for signalling of resource assignments for PDSCH transmissions using rank 1 closed loop precoding (transmission mode 6). The information of format 1B can be generally the same as in DCI Mode 1A, but an indicator of the precoding vector is added. In accordance with an embodiment a transport block and code word selection and reinterpretation of the precoding matrix indication (PMI) can be added to the DCI format 1B element to allow for mapping of a code word to a CRS port out of two possible ports, or two CRS ports out of four possible ports. If four CRS ports are used, a rank indication bit can also be added.

Another possible mode is a transmission mode that is based on use of dedicated or demodulation reference signals (DRS or DM RS). The dedicated reference signals are typically used for downlink (DL) transmission modes 7-9. For example, a modified DCI format 1 can be used for carrying the additional information needed in this mode. For example, information regarding an antenna port and a transport block and code word selection can be provided. A rank indication bit can be used if more than two layers for spatial multiplexing of MIMO in PHY are used. Up to four layers can be mapped to one codeword.

Another example is a uplink transmission mode where a modified DCI format 0 can be used. DCI format 0 is typically used for physical uplink shared channel (PUSCH) grants. The modified DCI format 0 can include indication of which transport block/code word is transmitted and an antenna port indication. A rank indication bit can be used in case of more than two layers being used.

A user equipment can monitor multiple PDCCHs when such a transmission mode is configured therein. The user equipment may identify which antenna port and transport block the relevant PDCCH is referring to.

A new transmission mode for the dual or multiple PDCCH transmissions may need to be specified in the PHY and RRC specifications.

Fixed mapping between code word and antenna port may be used in certain applications of the DRS mode and uplink mode.

Part of the information can be signalled implicitly. For example, the information can be signalled by linking different parts of an available search space to different transport blocks, and so on. However, explicit signalling in the downlink assignment/uplink grant, without limiting the use of the PDCCH for an antenna port to the corresponding search space can be used to provide a more flexible solution.

In certain applications a communication device at the downlink may need to check all possible combinations of PDCCH locations, PDCCH formats, and DCI formats and then behave accordingly. However, such a 'blind decoding' may require the communication device to make several decoding attempts in each subframe. This can be addressed by allocating the devices with a limited set of control channel element locations where a PDCCH may be placed. The set of locations in which a PDCCH can be located is often called the search space. The search space can be of a different size for each PDCCH format. Dedicated and common search spaces can be defined for the communication devices. A dedicated search space can be configured for each downlink device individually. All devices can be informed of the extent of a common search space.

If substantial amount of downlink control information is transmitted to one user equipment it might be necessary to extend the search space in order to avoid blocking. However, there may not be that many user equipments per a sector, and thus physical downlink control channel (PDCCH) blocking is considered not becoming too much of an issue in a typical use scenario. For example, it can be assumed that the maximum number of user equipments per sector is two.

In accordance with an embodiment a search space offset can be configured for the additional PDCCH(s). This enables distinguishing between the different control channels from different base stations. For example, search space offset can be associated with an antenna port indication.

ACK/NACK codebook for a hybrid automatic repeat request (HARQ) scheme can be based on the number of transport blocks that are configured. For example, it has been suggested that in the LTE up to two transport blocks can be configured and that related ACK/NACK messages can be fed back to the base station.

The communications between the base station sites and the user equipment can be provided by means of relaying. In relaying entities referred to as relay stations (RSs) or relay nodes (RNs) can be provided between the base stations and the user equipment. The relay nodes can be fixed, for example other base stations, or mobile, for example mounted on a train as shown in FIGS. 1 and 5. In some systems the relaying nodes or stations may be provided by opportunistically available user equipments/mobile terminals that are not as such a part of the communication network. A relay node (RN) can be wirelessly connected to the communication system, typically to a station connected to a radio-access network. Such a station is often referred to as a donor station or donor cell. The donor station provides resources for wireless backhauling, or a backhaul link, for the relay.

An appropriately adapted computer program code product or products may be used for implementing the embodiments, when loaded or otherwise provided on an appropriate data processing apparatus, for example for causing determinations of appropriate configurations and/or resource allocations and communications of information between the various nodes. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It is noted that whilst embodiments have been described in relation to communications system such as those based on the LTE-Advanced (LTE-A) systems and 3GPP based systems and with relation to signalling on the PDCCH, similar principles can be applied to other communication systems and control channels. Non-limiting examples of other communication systems include those based on the WCDMA and HSPA. Thus, instead of communications between communication devices such as a user equipment and base stations the communications may be provided in different scenarios such as in communications taking place directly between two or more user equipments. For example, this may be the case in application where no fixed station equipment is provided but a communication system is provided by means of a plurality of user equipment, for example in adhoc networks. Also, the above principles can also be used in networks where relay nodes are employed for relaying transmissions between stations. Therefore, although certain embodiments were described above by way of example with reference to certain exemplifying architectures for wireless networks, technologies and standards, embodiments may be applied to any other suitable forms of communication systems than those illustrated and described herein.

It is also in noted that although FIGS. 1 and 5 show examples where the downlink device is located on a train and where separate relay nodes are used, this is not the only use scenario. Instead, any arrangement where different antennas of a service area can provided independent resource allocation for a downlink communication device is intended to be covered by this disclosure.

In accordance with a possibility antennas on a train are a part of the train's communication system and for a part of a communication system for transporting train control related signals.

It is also noted herein that while the above describes exemplifying embodiments of the invention, there are several variations and modifications which may be made to the disclosed solution without departing from the spirit and scope of the present invention.

What is claimed is:

1. A method comprising:
   receiving by a communication device a transmission mode enabling use of a plurality of antennas;
   monitoring a plurality of physical downlink: control channels for information on resources allocated for the communication device for communications via the plurality of antennas in a service area, wherein an offset is used between search spaces associated with the plurality of physical downlink control channels;
   receiving, on the plurality of physical downlink control channels, the information on the resources allocated for the communication device for the communications via the plurality of antennas in the service area;
   associating the plurality of physical downlink control channels with antenna ports and transport blocks; and
   communicating via the plurality of antennas based on the received information.

2. A computer program product comprising a non-transitory computer-readable storage medium bearing computer program code embodied therein for use with a computer, the computer program code comprising code for performing the method according to claim 1 when the computer program code is run on a processor.

3. A method comprising:
   providing a communications device with a transmission mode enabling use of a plurality of antennas;
   allocating resources for the communication device for communications via the plurality of antennas in a service area;
   associating a plurality of physical downlink control channels with antenna ports and transport blocks; and
   sending, on the plurality of physical downlink control channels, information on said allocated resources to the communication device, wherein an offset is used between search spaces associated with the plurality of physical downlink control channels.

4. The method according to claim 3, wherein resources are allocated independently for communication via each of the antennas.

5. The method according to claim 3, wherein the communications comprise communications on a single carrier.

6. The method according to claim 3, further comprising providing the communication device with information of at least one of an allocated transport block, code word selection, rank, and antenna port.

7. The method according to claim 3, further comprising communicating information of at least one of transmitted transport block, code word, rank, and antenna port in a downlink control information element.

8. The method according to claim 3, further comprising allocating different resources for transport blocks associated with different antennas.

9. The method according to claim 3, further comprising using space frequency block coding for communications.

10. A computer program product comprising a non-transitory computer-readable storage medium bearing computer program code embodied therein for use with a computer, the computer program code comprising code for performing the method according to claim 3 when the computer program code is run on a processor.

11. An apparatus comprising:
   at least one processor; and
   at least one memory including computer program code,
     wherein the at least one memory and the computer program code are configured, with the at least one processor, to:
   receive a transmission mode enabling use of a plurality of antennas;
   monitor a plurality of physical downlink control channels for information on resources allocated for communications via the plurality of antennas in a service area, wherein an offset is used between search spaces associated with the plurality of physical downlink control channels;

receive, on the plurality of physical downlink control channels, the information on the resources allocated for the communications via the plurality of antennas in the service area;

associate the plurality of physical downlink control channels with antenna ports and transport blocks; and communicate via the plurality of antennas based on the received information.

12. The apparatus according to claim 11, wherein resources are allocated independently for communications via each of the antennas.

13. The apparatus according to claim 11, wherein the apparatus is configured to communicate on a single carrier via the plurality of antennas.

14. The apparatus according to claim 11, wherein the at least one memory and the computer program code are further configured, with the at least one processor, to provide the apparatus with information of at least one of an allocated transport block, code word selection, rank, and antenna port.

15. The apparatus according to claim 11, wherein the at least one memory and the computer program code are further configured, with the at least one processor, to allocate different resources for transport blocks associated with different antennas.

16. The apparatus according to claim 11, wherein the apparatus is configured to have a transmission mode enabling use of the plurality of physical downlink control channels and antennas.

17. The apparatus as claimed in claim 11 comprising a base station or a mobile user equipment.

18. A communication system comprising the apparatus of claim 11.

19. An apparatus comprising:
at least one processor; and
at least one memory including computer program code, wherein the at least one memory and the computer program code are configured, with the at least one processor, to:
provide a communications device with a transmission mode enabling use of a plurality of antennas;
allocate resources for the communication device for communications via the plurality of antennas in a service area;
associate a plurality of physical downlink control channels with antenna ports and transport blocks; and
send, on the plurality of physical downlink control channels, information on said allocated resources to the communication device, wherein an offset is used between search spaces associated with the plurality of physical downlink control channels.

* * * * *